US009923622B2

United States Patent
Jactat et al.

(10) Patent No.: US 9,923,622 B2
(45) Date of Patent: Mar. 20, 2018

(54) COMMUNICATION SYSTEM

(75) Inventors: Caroline Jactat, Paris (FR); Gottfried Punz, Vienna (AT); Sadafuku Hayashi, Tokyo (JP); Thomas Delsol, Paris (FR)

(73) Assignee: NEC Corporation, Tokyo (JP)

( * ) Notice: Subject to any disclaimer, the term of this patent is extended or adjusted under 35 U.S.C. 154(b) by 481 days.

(21) Appl. No.: 14/348,219

(22) PCT Filed: Aug. 29, 2012

(86) PCT No.: PCT/JP2012/072520
§ 371 (c)(1),
(2), (4) Date: Mar. 28, 2014

(87) PCT Pub. No.: WO2013/047118
PCT Pub. Date: Apr. 4, 2013

(65) Prior Publication Data
US 2014/0226559 A1  Aug. 14, 2014

(30) Foreign Application Priority Data
Sep. 30, 2011  (GB) .................................. 1116924.0

(51) Int. Cl.
*H04W 84/04* (2009.01)
*H04B 7/155* (2006.01)
(Continued)

(52) U.S. Cl.
CPC ....  *H04B 7/15507* (2013.01); *H04W 36/0055* (2013.01); *H04W 84/047* (2013.01);
(Continued)

(58) Field of Classification Search
CPC . H04W 84/047; H04W 36/32; H04W 84/005; H04W 36/08
See application file for complete search history.

(56) References Cited

U.S. PATENT DOCUMENTS 7,323,991 B1 *  1/2008  Eckert ................. G07C 9/00111
                                                235/382
2002/0138195 A1   9/2002  Watanabe
(Continued)

FOREIGN PATENT DOCUMENTS

EP  1206153 A2  5/2002
EP  1244321 A1  9/2002
(Continued)

OTHER PUBLICATIONS

3GPP TS 36.300 V10.4.0. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Jun. 2011, 194 pages.
(Continued)

*Primary Examiner* — Romani Ohri
(74) *Attorney, Agent, or Firm* — Wilmer Cutler Pickering Hale and Dorr LLP

(57) ABSTRACT

A mobile communications system is described in which the network configures a mobile relay node that is mounted in a moving vehicle (such as a train) with expected tracking area information for the route along which the vehicle is expected to travel. UEs associated with the mobile relay node are provided with the list and do not perform tracking area updates if the movement of the vehicle corresponds to the stored list. Where advance knowledge of the route is not available, the mobile relay node is configured with a fixed tracking area and a fixed radio cell so that associated UEs do not detect a change in the tracking area or in the radio cell and so do not perform tracking area updates towards the network or the network does not need to control the UEs mobility while having a radio connection with the network.

27 Claims, 14 Drawing Sheets

(51) Int. Cl.
*H04W 36/00* (2009.01)
*H04W 36/32* (2009.01)
*H04W 36/08* (2009.01)
*H04W 84/00* (2009.01)

(52) U.S. Cl.
CPC ............ *H04W 36/08* (2013.01); *H04W 36/32* (2013.01); *H04W 84/005* (2013.01)

(56) References Cited

U.S. PATENT DOCUMENTS

| | | | |
|---|---|---|---|
| 2003/0013445 A1 | 1/2003 | Fujiwara et al. | |
| 2005/0197121 A1 | 9/2005 | Fujiwara et al. | |
| 2006/0046748 A1 | 3/2006 | Shinozaki | |
| 2007/0249347 A1* | 10/2007 | Saifullah | H04W 36/38 455/436 |
| 2008/0194274 A1* | 8/2008 | Ko | H04W 68/10 455/456.3 |
| 2009/0233599 A1 | 9/2009 | Shinozaki | |
| 2010/0260096 A1* | 10/2010 | Ulupinar | H04B 7/2606 370/315 |
| 2010/0272009 A1* | 10/2010 | Cheng | H04W 52/346 370/315 |
| 2011/0124330 A1* | 5/2011 | Kojima | H04W 36/32 455/424 |
| 2011/0208842 A1* | 8/2011 | Mildh | H04B 7/155 709/220 |
| 2012/0039246 A1 | 2/2012 | Zhang et al. | |
| 2012/0113887 A1 | 5/2012 | Shen et al. | |
| 2012/0230249 A1 | 9/2012 | Fukumoto et al. | |
| 2013/0003650 A1 | 1/2013 | Han et al. | |
| 2013/0044639 A1* | 2/2013 | Wang | H04B 7/155 370/254 |
| 2013/0090123 A1* | 4/2013 | Gunnarsson | H04B 7/15528 455/450 |
| 2013/0137434 A1* | 5/2013 | Godin | H04W 8/24 455/436 |
| 2013/0225166 A1* | 8/2013 | Akhtar | H04W 24/02 455/435.1 |
| 2013/0273890 A1* | 10/2013 | Du | H04W 4/08 455/411 |

FOREIGN PATENT DOCUMENTS

| | | |
|---|---|---|
| EP | 1631095 A1 | 3/2006 |
| EP | 2372977 A1 | 10/2011 |
| JP | 2002152804 A | 5/2002 |
| JP | 2004104623 A | 4/2004 |
| JP | 2006067447 A | 3/2006 |
| JP | 2006157957 A | 6/2006 |
| JP | 2006521715 A | 9/2006 |
| JP | 3830100 B2 | 10/2006 |
| JP | 2011172292 A | 9/2011 |
| JP | 2012501139 A | 1/2012 |
| WO | WO-2002041659 A1 | 5/2002 |
| WO | WO-2004/086681 A2 | 10/2004 |
| WO | WO-2010023432 A2 | 3/2010 |
| WO | WO-2010089949 A1 | 8/2010 |
| WO | WO-2010/124458 A1 | 11/2010 |
| WO | WO-2011/000193 A1 | 1/2011 |
| WO | WO-2011/058991 A1 | 5/2011 |
| WO | WO-2011/102772 A1 | 8/2011 |
| WO | WO-2011/113202 A1 | 9/2011 |
| WO | WO-2011/114464 A1 | 9/2011 |

OTHER PUBLICATIONS

3GPP TS 36.331 V10.2.0. "3rd Generation Partnership Project; Technical Specification Group Radio Access Network; Evolved Universal Terrestrial Radio Access (E-UTRA); Radio Resource Control (RRC); Protocol specification (Release 10)", Jun. 2011, 295 pages.
3GPP TS 36.413 V10.2.0. "3rd Generation Partnership Project; Technical Specification Group Radio Access Network; Evolved Universal Terrestrial Radio Access Network (E-UTRAN); S1 Application Protocol (S1AP) (Release 10)", Jun. 2011, 253 pages.
International Search Report dated for PCT/JP2012/072520, Oct. 10, 2012, 3 pages.
Extended European Search Report corresponding to European Application No. 12834941.2, dated Mar. 30, 2015, 9 pages.
Japanese Office Action issued by the Japan Patent Office for Japanese Application No. 2014-531479 dated Mar. 9, 2016 (13 pages).

\* cited by examiner

COMMUNICATION SYSTEM

CROSS-REFERENCE TO RELATED APPLICATIONS

This application is a national stage application of International Application No. PCT/JP2012/072520 entitled "COMMUNICATION SYSTEM", filed on Aug. 29, 2012, which claims the benefit of the priority of United Kingdom Patent Application No. 1116924.0, filed on Sep. 30, 2011, the disclosures of each of which are hereby incorporated by reference in their entirety.

TECHNICAL FIELD

The present invention relates to a communication system and to components thereof for providing relay services to mobile or fixed communication devices. The invention has particular but not exclusive relevance to relay services used in Long Term Evolution (LTE) Advanced systems as currently defined in 3GPP standards documentation TS 36-300 V10.4.0, TS 36-331 V10.2.0 and TS 36.413 V10.2.0.

BACKGROUND ART

Relaying is considered for LTE Advanced as a tool to improve, for example, the coverage of high data rates for User Equipment (UE), temporary network deployment, the cell edge throughput and/or to provide coverage in new cell areas. LTE Advanced supports relaying by having a Relay Node (RN) wirelessly connected to a base station (eNB) (referred to as a Donor eNB (DeNB)). In addition to serving its own 'donor' cell, the Donor eNB serves the RN, via a modified version of the Evolved Universal Terrestrial Radio Access (E-UTRA) radio interface. The modified interface is referred to as the 'Un' interface.

Each RN is provided with many aspects of a base station's functionality and is therefore capable of acting as a base station serving its own 'relay' cell. From the perspective of the user equipment in the relay cell, therefore, the RN essentially appears to be a conventional LTE base station. In addition to the base station functionality, however, the RN also supports a subset of the UE functionality including, for example, many aspects of the physical layer, Medium Access Control (MAC), radio resource control (RRC), and non access stratum (NAS) functionality, to allow it to connect wirelessly to a Donor eNB.

In some situations, the RN will be installed in a moving vehicle, such as on a train, bus, ship or the like. Such a mobile RN will change its attachment from one Donor eNB to another, as its geographical location changes. When a mobile RN moves to a new Donor eNB that belongs to a new Tracking Area (TA), the mobile RN will broadcast an identifier for the new TA to the UEs it serves. This will then cause these UEs to initiate signalling to the core network to inform the network of the new TA in which the UE is located (for the purpose of finding the UE when an incoming call is made to the UE). For UEs already actively connected to the core network, this involves sending an RRC connected mode mobility signalling message and for UEs in an Idle mode, this involves sending a TA update message to a Mobility Management Entity (MME) in the core network.

As these UEs will all change TAs at the same time, there will be a surge of signalling messages and this can result in signalling failure over the air interface between the RN and the Donor eNB and can result in a loss of connection for UEs in an active mode.

The inventors have realized that there is a need to provide a new way to inform the network about the change of tracking area of UEs connected via such a mobile RN.

SUMMARY OF INVENTION

The present invention aims to provide an improved communication system and improved components of the communication system which overcome or at least alleviate the above issues.

Accordingly one aspect of the present invention provides a relay node for use in a communications system that has a plurality of base stations arranged in a plurality of tracking areas, the relay node comprising: a transceiver circuit for transmitting signals to and for receiving signals from a base station and for transmitting signals to and for receiving signals from one or more user devices that are associated with the relay node; a memory for storing a relay node identifier (and possibly moving relay node information); and a communications controller for controlling communications between the associated user device and the base station; wherein the communications controller is operable to send the base station the relay node identifier when the relay node connects to the base station; and wherein the communications controller is operable to receive a connection message from an associated user device and is arranged to insert the relay node identifier into the connection message and to transmit the connection message to the base station.

The invention also provides a base station for use in a communication system, the base station comprising: a transceiver circuit arranged to transmit signals to and receive signals from a network node of the communication system and to transmit signals to and receive signals from a relay node that allows one or more user devices to connect to the base station through the relay node; and a communications controller operable to receive a relay node identifier when the relay node connects to the base station and operable to send the relay node identifier to the network node; and wherein the communications controller is operable to receive from the relay node, a connection message from a user device associated with the relay node and is operable to send the received connection message together with the relay node identifier to the network node.

The invention also provides a network node for use in a communications system that has a plurality of base stations arranged in a plurality of tracking areas, the network node comprising: a transceiver circuit arranged to transmit signals to and receive signals from the base stations; and a communications controller operable to receive, from a first base station, a relay node identifier when a relay node connects to the first base station and operable to store the relay node identifier together with tracking area data corresponding to the tracking area associated with the first base station from which the relay node identifier is received; and wherein said communications controller is operable to receive, from the first base station, a connection message from a user device associated with the relay node and is operable to store data associating the user device with the relay node such that tracking area data associated with the relay node is also associated with the user device.

The invention also provides a user device for use with a communication system, the user device comprising: a transceiver circuit arranged to transmit signals to and receive signals from a mobile relay node; and a communications controller operable to associate with the mobile relay node and to receive from the mobile relay node a current tracking area in which the mobile relay node is located; a tracking area handler operable to transmit tracking area update messages when the user device enters a new tracking area; wherein the communications controller is operable to receive a predefined list of tracking areas through which the mobile relay node is expected pass and operable to inhibit operation of the tracking area handler when the new tracking area is on the predetermined list.

The invention also provides a relay node for use in a communications system that has a plurality of base stations, the relay node comprising: means for sending to a base station, a relay node identifier when the relay node connects to the base station; means for receiving a connection message from an associated user device; means for inserting the relay node identifier into the received connection message; and means for transmitting the connection message to the base station.

The invention also provides a base station for use in a communication system, the base station comprising: means for receiving a relay node identifier when a relay node connects to the base station; means for sending the relay node identifier to a network node of the communication system; means for receiving from the relay node, a connection message from a user device associated with the relay node; and means for sending the received connection message together with the relay node identifier to the network node.

The invention also provides a network node for use in a communications system that has a plurality of base stations arranged in a plurality of tracking areas, the network node comprising: means for receiving, from a first base station, a relay node identifier when a relay node connects to the first base station; means for storing the relay node identifier together with tracking area data corresponding to a tracking area associated with the first base station; and means for receiving, from the first base station, a connection message from a user device associated with the relay node; and means for storing data associating the user device with the relay node such that tracking area data associated with the relay node is also associated with the user device.

The invention also provides a user device for use with a communication system, the user device comprising: means for associating with a mobile relay node; means for receiving, from the mobile relay node, a current tracking area in which the mobile relay node is located; means for transmitting a tracking area update message when the user device receives a new tracking area; means for receiving a predefined list of tracking areas through which the mobile relay node is expected pass; and means for preventing a tracking area update message from being transmitted when the new tracking area is on the predetermined list.

The invention also provides corresponding methods and computer software products that may be provided on a carrier signal or on a recording medium.

BRIEF DESCRIPTION OF DRAWINGS

Embodiments of the invention will now be described, by way of example only, with reference to the attached figures in which.

MODE FOR CARRYING OUT THE INVENTION

Embodiment 1—Overview

In telecommunication systems operating according to the GSM standard, user equipment, such as mobile telephones are tracked in Location Areas and Routeing Areas. According to the UMTS standards, user equipment can be tracked in UTRAN Registration Areas as well as Location Areas and Routeing Areas. In LTE, "tracking area" is used as a generic name for Location Areas, Routeing Areas and UTRAN Registration Areas.

Figure 1:
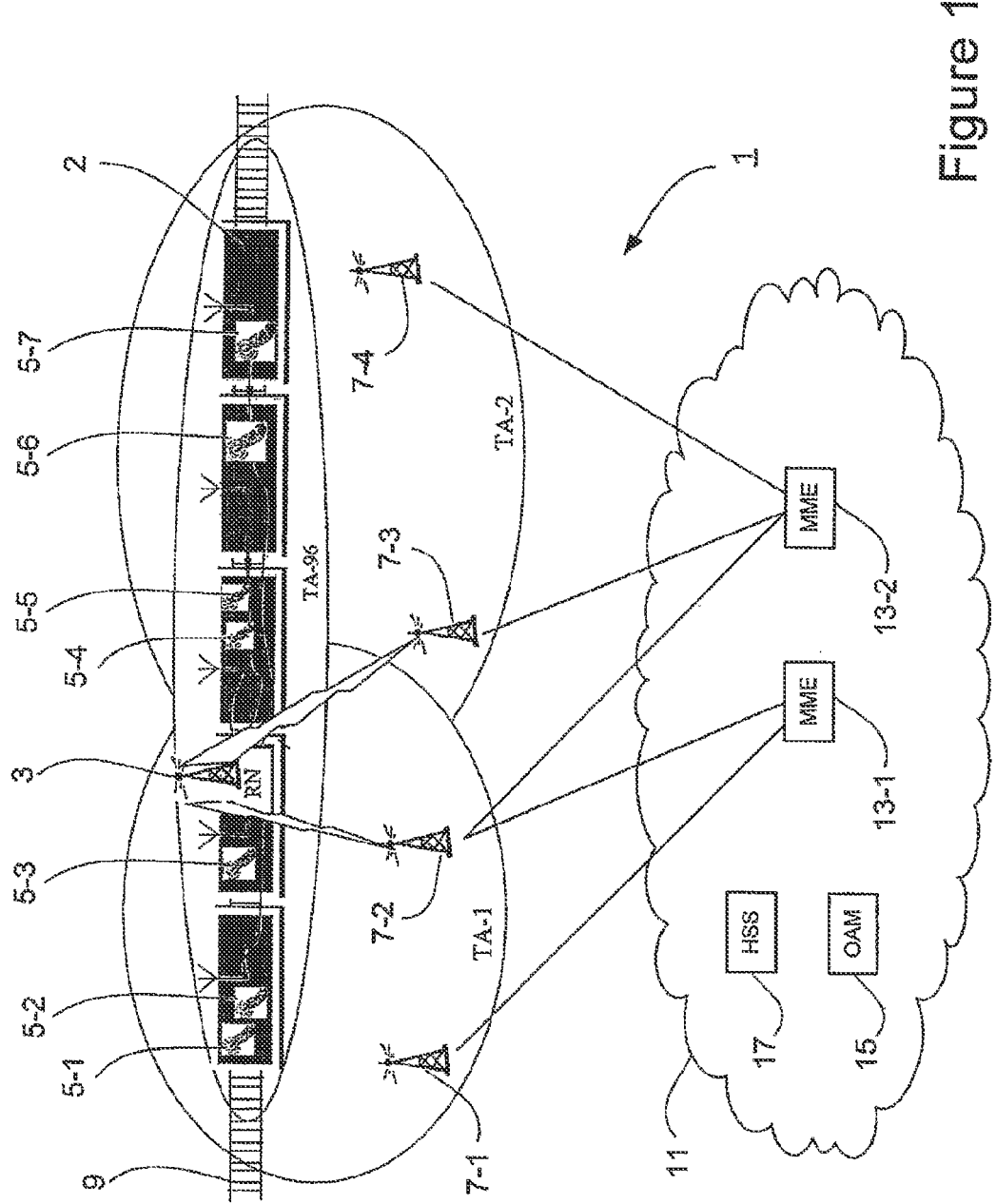
FIG. 1 schematically illustrates a mobile telecommunication system having a mobile relay node mounted in a train.

FIG. 1 schematically illustrates a mobile (cellular) telecommunication system 1 that includes a train 2 having a mobile relay node (RN) 3 that provides base station functionality for a plurality of user equipments (UEs) 5-1 to 5-7, e.g. mobile telephones, carried by users in the train 2. The mobile relay node 3 attaches to donor base stations 7-1 to 7-4 as it travels along a track 9. Donor base stations 7-1 and 7-2 belong to tracking area TA-1 and donor base stations 7-3 and 7-4 belong to tracking area TA-2. The telecommunications system 1 also includes a core network 11 that includes Mobility Management Entities (MMEs) 13-1 and 13-2 that manage the mobility of UEs within the core network 11; an Operations and Maintenance unit (OAM) 15 which configures the various devices in the core network; and a Home Subscriber Server (HSS) 17 which stores subscriber data associated with the different UEs 5. The donor base stations 7 in TA-1 are coupled with MME 13-1 and the donor base stations 7 in TA-2 are coupled to MME 13-2, although a single MME may well serve multiple base stations located in different tracking areas.

As the train 2 travels along the track 9 and the mobile relay node 3 hands over from donor base station 7-2 to donor base station 7-3, the tracking area in which the mobile RN 3 and the UEs 5 are located changes. This causes the problems discussed above. In this exemplary embodiment, however, the mobile relay node 3 is assigned its own fixed cell ID and tracking area (in this example TA-96), which it broadcasts to the UEs 5 associated therewith. The mobile relay node 3 does not change its tracking area identifier when it moves from TA-1 to TA-2. Therefore, in this exemplary embodiment, the UEs 5 are not aware of the change in location and operate as if they are not moving. Of course, they are moving with the train 2 and the core network 11 needs to keep track of the location of the UEs 5 that are being served by the mobile relay node 3. In this exemplary embodiment, this is achieved by arranging the mobile relay node 3 to include its identifier in a signalling message that is sent by the UE 5 to the core network 11 at least at the time that the UE 5 first registers with the mobile relay node 3. This might be, for example, a tracking area update message sent when the UE 5 moves into the tracking area associated with the mobile relay node 3 or in a handover message as the UE 5 hands over to the cell of the mobile relay node 3. The MME 13 can thus store information identifying the UEs 5 that are registered via the mobile relay node 3 and will thus move with the mobile relay node 3. Then, when the mobile relay node 3 moves from one tracking area to another, the MME 13 tracks the movement of the mobile relay node 3 and hence the movement of the associated UEs 5. The MME 13 may track this movement from: i) path switch requests or handover notification messages it receives as the mobile relay node 3 moves from donor base station 7-2 to donor base station 7-3; or ii) from a NAS tracking area update message that the mobile relay node 3 sends (if it is programmed to report such changes in tracking areas). If a UE 5 leaves the train 2, then it will detect a new tracking area and will thus initiate a NAS tracking area update message that will inform that MME 13 that the UE 5 is no longer associated with the mobile relay node 3. In this way the MME 13 is kept informed of the locations of the UEs 5 that move with the train 2 and the UEs 5 do not need to signal new location areas to the network—saving on traffic transmitted over the air interface and saving UE battery power.

A more detailed description of the components of this exemplary embodiment and of the two alternative ways that the MME 13 tracks movement of the mobile relay node 3 will now be described with reference to FIGS. 2 to 7.

User Equipment

Figure 2:
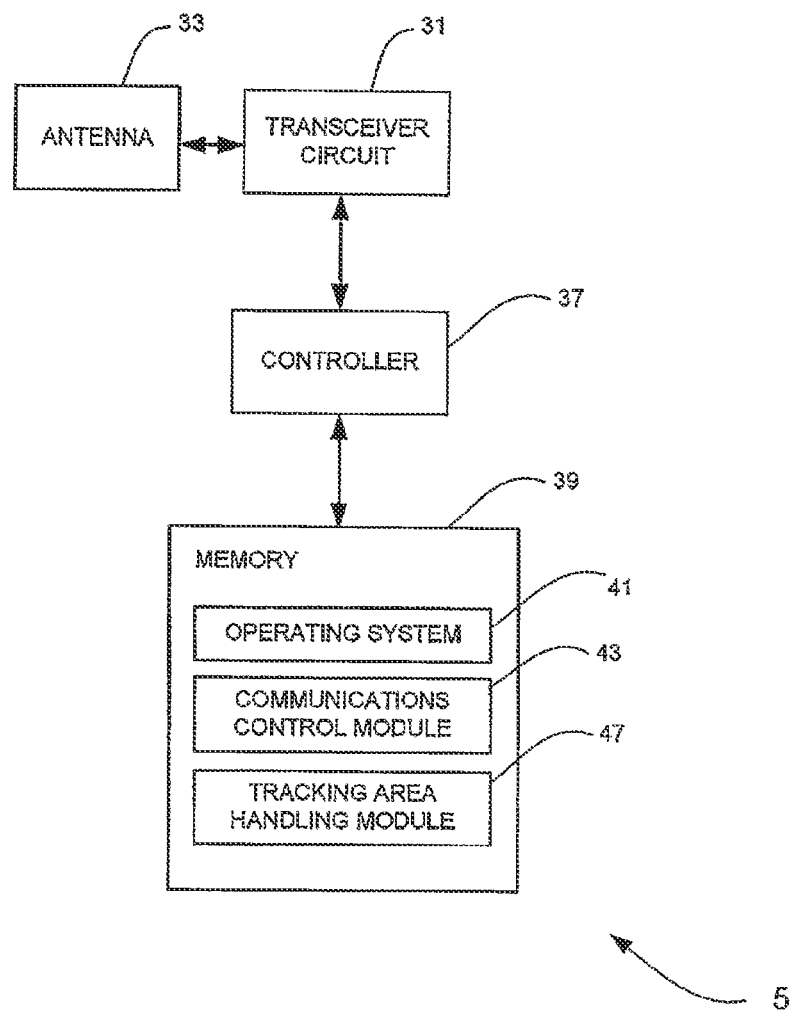
FIG. 2 is a block diagram illustrating the main components of user equipment forming part of the system shown in FIG. 1.

FIG. 2 schematically illustrates the main components of the user equipment 5 shown in FIG. 1. As shown, the user equipment 5 includes a transceiver circuit 31 which is operable to transmit signals to, and to receive signals from, the mobile relay node 3 (or a base station 7 directly) via at least one antenna 33. The operation of the transceiver circuit 31 is controlled by a controller 37 in accordance with software stored in a memory 39. The software includes, among other things, an operating system 41, a communications control module 43 and a tracking area handling module 47.

The communications control module 43 is operable to control communication with the mobile relay node 3 including, for example, determining resources to be used by the transceiver circuit 31 in its communications with the mobile relay node 3.

The tracking area handling module 47 is operable to detect the tracking area identifier provided by the mobile relay node 3 and to cause the UE 5 to send a tracking area update message when it changes.

Base Station

Figure 3:
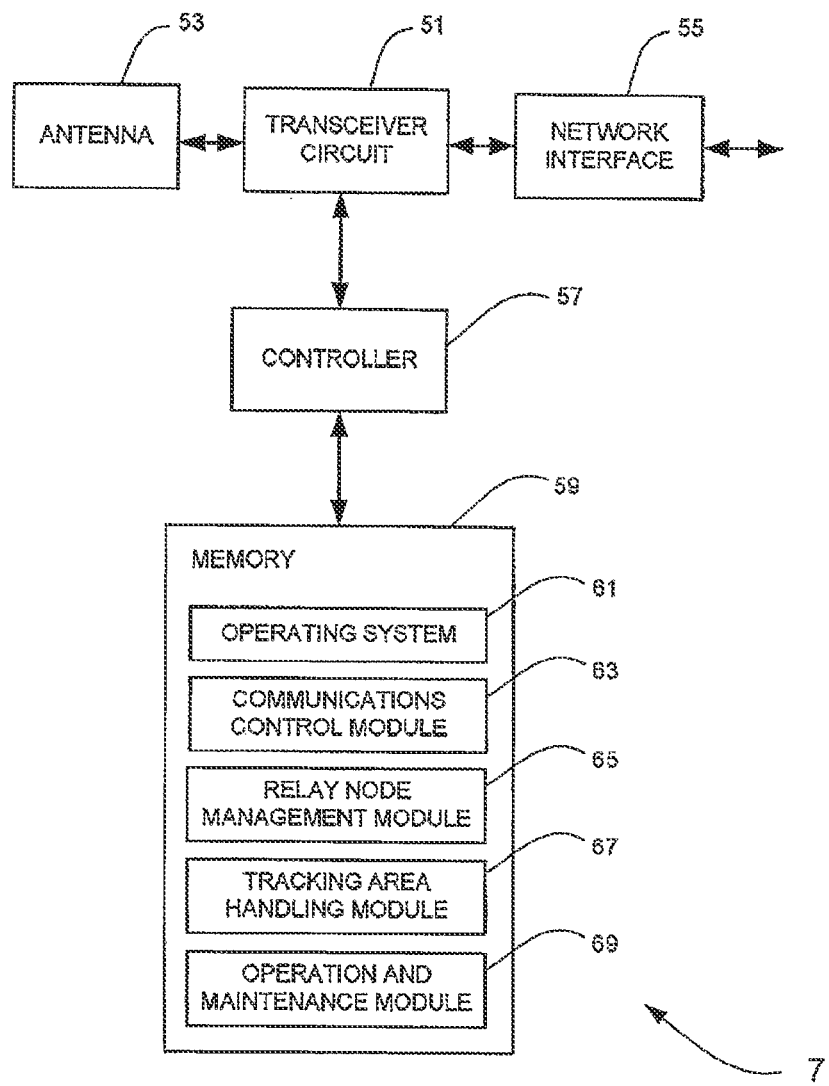
FIG. 3 is a block diagram illustrating the main components of a base station forming part of the system shown in FIG. 1.

FIG. 3 is a block diagram illustrating the main components in the base station 7, such as in the donor base station 7-1 shown in FIG. 1. The base station 7 is a fixed communications node providing services to the user equipment 5 within its coverage area. In the exemplary embodiments according to the present invention, the base station 7 is communicating with the user equipment 5 via a mobile relay node 3. As shown, the base station 7 includes a transceiver circuit 51 which is operable to transmit signals to, and to receive signals from the mobile relay node 3 via at least one antenna 53. The base station 7 is also operable to transmit signals to and to receive signals from the MMEs 13 of the core network 11 and other base stations via a network interface 55. The operation of the transceiver circuit 51 is controlled by a controller 57 in accordance with software stored in a memory 59. The software includes, among other things, an operating system 61, a communications control module 63, a relay node management module 65, a tracking area handling module 67, and an operation and maintenance module 69.

The communications control module 63 is operable to control communications between the base station and the mobile relay nodes 3, UEs 5 and the network devices (such as the MME).

The relay node management module 65 is operable to control the connection between the base station 7 and the mobile relay node 3 attached thereto.

The tracking area handling module 67 is operable to maintain and broadcast an identification of the tracking area(s) allocated to the base station 7 by the network. The base station 7 might have multiple cells, which are typically allocated to the same tracking area. However, each one of these cells might be allocated to a different tracking area, or at least some of them might be allocated to one tracking area, while others might be allocated to a different tracking area. However, each cell is allocated to only one tracking area.

The operations and maintenance module 69 is responsible for storing operating parameters, such as the tracking area identifier(s), for the base station 7 which it receives typically from the OAM 15.

Relay Node

Figure 4:
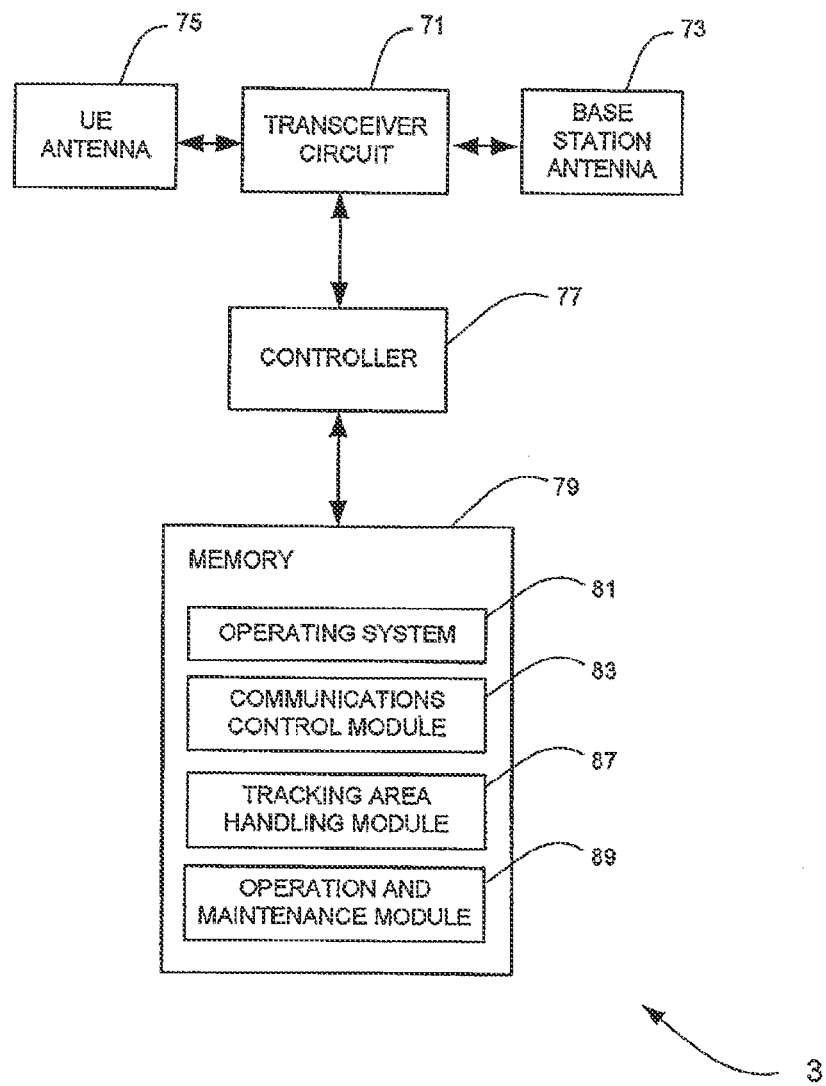
FIG. 4 is a block diagram illustrating the main components of the mobile relay node forming part of the system shown in FIG. 1.

FIG. 4 schematically illustrates the main components of the mobile relay node 3 shown in FIG. 1. The mobile relay node 3 is a communications node like the base station 7, providing services within its own coverage area, but the mobile relay node 3 does not connect directly to the core network 11. Instead, it connects wirelessly to a donor base station 7, which is then operable to provide a connection to the core network 11.

As shown, the mobile relay node 3 includes a transceiver circuit 71 which is operable to transmit signals to, and to receive signals from, the base station 7 via base station antenna 73 and the user equipment 5 via the UE antenna 75. The operation of the transceiver circuit 71 is controlled by a controller 77 in accordance with software stored in a memory 79. The software includes, among other things, an operating system 81, a communications control module 83, a tracking area handling module 87, and an operation and maintenance module 89.

The communications control module 83 is operable to control communication with the user equipment 5 and the base station 7 including, for example, allocation of resources to be used by the transceiver circuit 71 in its communications with each of the user equipment 5 and with the base station 7.

The tracking area handling module 87 is operable to cause the mobile relay node to transmit a fixed tracking area identifier that has been preconfigured in the mobile relay node or that is assigned to the mobile relay node by the core network 11. The tracking area handling module 87 is also responsible for sending tracking area update messages when programmed to do so.

The operation and maintenance module 89 is responsible for storing various operating parameters, such as the tracking area identifier(s), that it receives for the mobile relay node 3 from the OAM 15.

Mobility Management Entity

Figure 5:
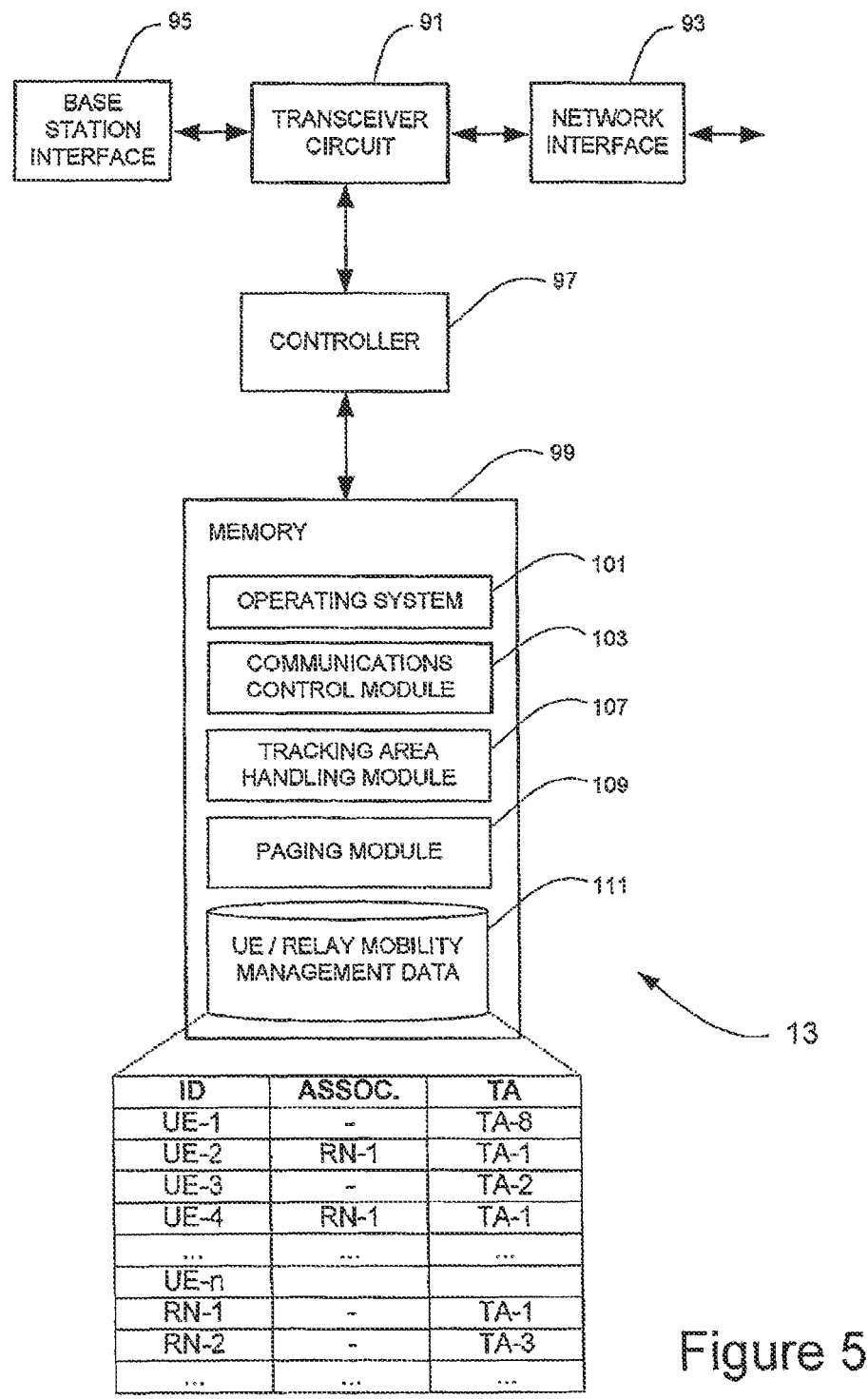
FIG. 5 is a block diagram illustrating the main components of a mobility management entity forming part of the system shown in FIG. 1.

FIG. 5 schematically illustrates the main components of the mobility management entity 13 shown in FIG. 1. As mentioned above, the MME 13 is a communications node that provides mobility services to the user equipment 5 by maintaining information about their current location within the mobile (cellular) telecommunication system 1, so that any communication initiated by or intended for the user equipment 5 can be forwarded appropriately. As shown, the mobility management entity 13 includes a transceiver circuit 91 which is operable to transmit signals to, and to receive signals from other network elements via the network interface 93 and to transmit signals to, and to receive signals from the base stations 7 via a base station interface 95. The operation of the transceiver circuit 91 is controlled by a controller 97 in accordance with software stored in a memory 99. The software includes, among other things, an operating system 101, a communications control module 103, a tracking area handling module 107 and a paging module 109. The memory 99 also stores UE/relay mobility management data 111 maintained and used by the MME 13.

The communications control module 103 is operable to control the communication with the various network devices such as the base stations 7, the OAM 15 and the HSS 17.

The tracking area handling module 107 is operable to maintain and update the UE/relay mobility management data 111 as they move around in the area controlled by the mobility management entity 13. When the UE/relay is no longer within the area controlled by the MME 13, the tracking area handling module 107 is operable to remove the data related to that UE/relay and to transfer the data to another mobility management entity responsible for the new area into which the UE/relay is moving.

The paging module 109 is operable to send paging messages for UEs 5 when a new communication is being set up for the UE 5. Such a new communication might be a voice call, a data connection or the like.

Operation

As discussed above, the MME 13 may track the movement of the mobile relay node (and hence the associated UEs) from: Option 1) path switch requests or handover notification messages it receives as the mobile relay node 3 moves from donor base station 7-2 to donor base station 7-3; or Option 2) from a NAS tracking area update message that the mobile relay node 3 sends (if it is programmed to report such changes in tracking areas). The operation of this exemplary embodiment for these two options will now be described in more detail.

Attach for Relay Operation (Option 1 and Option 2)

Figure 6A:
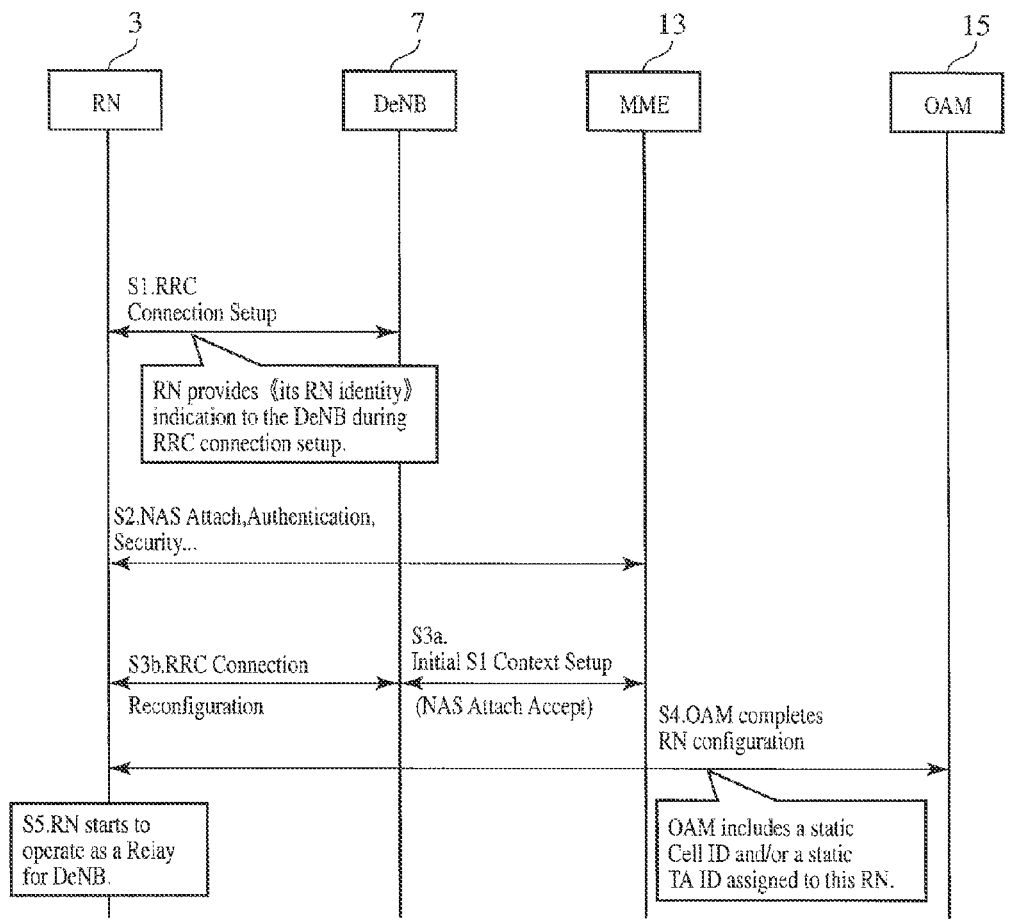
FIG. 6a is a timing diagram illustrating a procedure for attaching the mobile relay node to the base station.

FIG. 6a is a timing diagram illustrating the way in which the mobile relay node 3 attaches to the core network 11 via the donor base station 7 and receives its static cell ID and tracking area identifier. As shown, in step S1, the mobile relay node 3 initiates the procedure by sending an "RRC Connection Setup" request. The message contains, amongst other things, the identifier of the mobile relay node 3. In step S2, the mobile relay node 3 and the mobility management entity 13 perform the necessary "NAS Attach, Authentication, and Security" procedures that define the operation parameters used by the mobile relay node 3 and the core network. In step S3a, the "Initial S1 Context Setup" procedure is performed between the donor base station 7 and the mobility management entity 13, including sending the "NAS Attach Accept" response to the donor base station 7.

This is followed by the "RRC Connection Reconfiguration" procedure between the donor base station 7 and the mobile relay node 3, in step S3b. The mobile relay node 3 then receives the final configuration data from the OAM 15 in step S4. The configuration data includes a static cell ID and a static tracking area identifier assigned to the mobile relay node 3 for handling its mobility at radio cell level and tracking area level, respectively. The mobile relay node 3 can then start operating, in step S5, as a relay for the donor base station 7 and is ready to receive connections from user equipment 5 within its coverage area.

UE Attaching to the Network Via the Relay (Option 1 and Option 2)

Figure 6B:
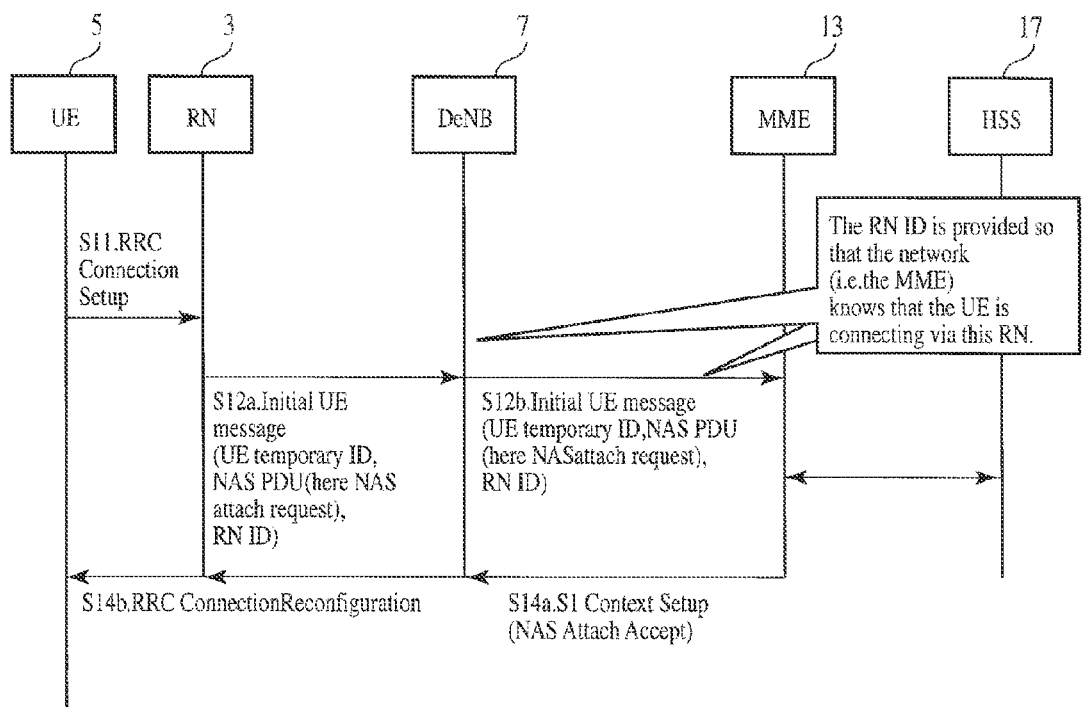
FIG. 6b is a timing diagram illustrating a procedure for attaching the user equipment, via the mobile relay node, to the mobile telecommunication system.

FIG. 6b is a timing diagram illustrating the way in which a UE 5 attaches to the core network 11 via the mobile relay node 3.

As shown, in step S11, the user equipment 5 sends an "RRC Connection Setup" request to the mobile relay node 3. In response to this, the mobile relay node 3 generates an "Initial UE message", which comprises the temporary ID for the user equipment 5, the "NAS Attach Request", and its own relay node identifier ("RN ID"). In step S12a, the mobile relay node 3 sends the generated message to the donor base station 7, which forwards it to the mobility management entity 13, in step S12b. As the relay node identifier is included in the received message, the mobility management entity 13 knows that the user equipment 5 is connecting via the identified mobile relay node 3. The mobility management entity 13 then stores in the UE/relay mobility management data 111, the tracking area identifier associated with the donor base station 7 that forwarded the "Initial UE message" for the tracking area to be associated with that UE 5. The MME 13 also stores an indication in the UE/relay mobility management data 111 that the UE is associated with the identified mobile relay node. This is illustrated in FIG. 5—which shows that UE-2 is associated with mobile relay node RN-1 and that they are both in tracking area TA-1. In step S14a, the MME 13 confirms, via the donor base station 7, that the user equipment 5 is now connected to the mobile relay node 3, by sending the "S1 Context Setup" message containing the "NAS Attach Accept" response. In step S14b, the mobile relay node 3 sends the "RRC Connection Reconfiguration" message to the user equipment 5. As the MME 13 is now aware that the UE 5 is connected via the mobile relay node 3, redundant signalling can be avoided (as will become clear from the description below).

Relay Node Mobility Without Changing MME (Option 1)

Figure 6C:
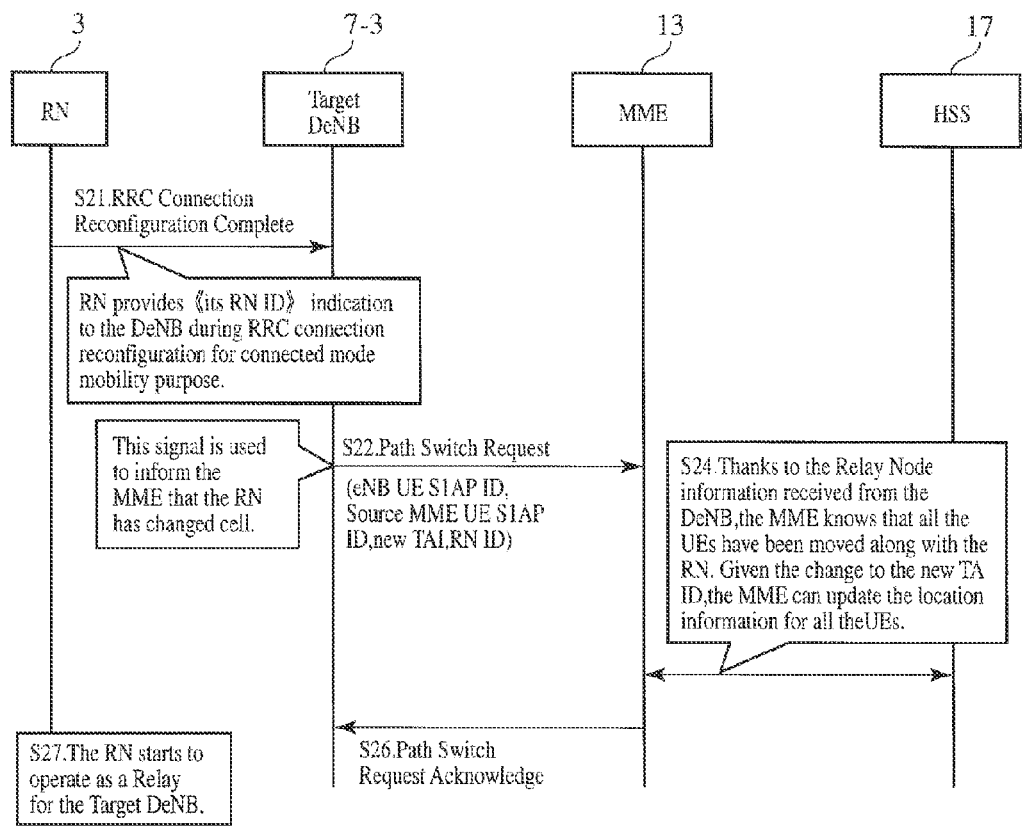
FIG. 6c is a timing diagram illustrating a first procedure for relay node mobility without MME involvement.

FIG. 6c illustrates, in general terms, the way in which the mobile relay node 3 hands over to a target donor base station 7-3 when the same MME 13 is used for the target donor base station 7-3. As shown, in step S21, the mobile relay node 3 sends the target donor base station 7-3 an RRC Connection Reconfiguration Complete message that includes its relay node identifier (RN ID) for connected mode mobility purposes. In response, in step S22, the target donor base station 7-3 sends a path switch request to the MME 13 that identifies, among other things the relay node identifier and the new tracking area associated with the target donor base station 7-3. The MME 13 is thus able to know that the mobile relay node has moved (or is in the process of moving) to the new tracking area identified in the received Path Switch Request. In step S24, the MME 13 updates the tracking area information stored for that mobile relay node 3 in the UE/relay mobility management data 111 and also updates the tracking area for UEs 5 that the MME 13 knows are associated with that mobile relay node 3. The MME 13 also informs the HSS 17 of the new tracking area for each of the UEs 5 associated with the mobile relay node 3, in order to update the location information of all UEs 5 towards the HSS 17. Therefore, the MME 13 and the HSS 17 can keep track of the UEs 5 associated with the mobile relay node 3, without them having to transmit any new message to the core network 11. The MME 13 also sends a path switch request acknowledgement back to the target donor base station 7-3 in step S26. This completes the procedure and the mobile relay node 3 starts to operate as a relay for the target donor base station 7-3 in step S27.

Relay Node Mobility with Change of MME (Option 1)

Figure 6D:
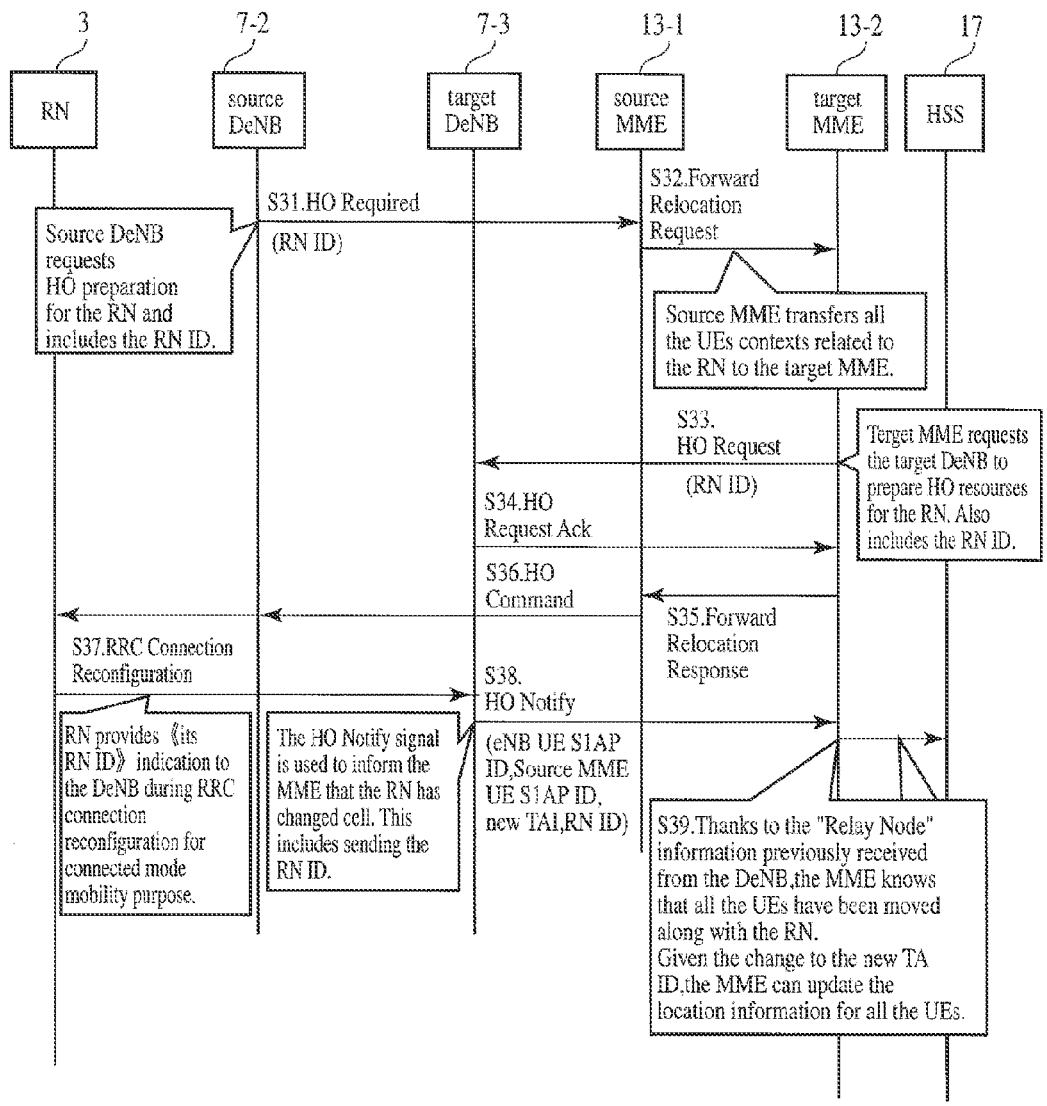
FIG. 6d is a timing diagram illustrating a first procedure for relay node mobility with MME involvement.

FIG. 6*d* illustrates, in general terms, the way in which the mobile relay node 3 hands over to a target donor base station 7-3 when the MME 13 is also changed because the target donor base station 7-3 is served by a different MME 13. As shown, in step S31 the source donor base station 7-2 sends the source MME 13-1 a HO Required message that includes the relay node identifier (RN ID) of the mobile relay node 3 to be handed over. In step S32, the source MME 13-1 sends the target MME 13-2 a Forward Relocation Request message that includes details of the mobile relay node and all the UE context information stored in the source MME 13-1 for the UEs 5 associated with that mobile relay node 3. At step S33, the target MME 13-2 sends a HO Request message to the target donor base station 7-3 that includes the relay identifier for the mobile relay node 3. This message requests that the target donor base station 7-3 prepares the HO resources for the mobile relay node 3. In response, the target donor base station 7-3 sends, in step S34 a HO Request acknowledgement message back to the target MME 13-2. The target MME 13-2 then sends the source MME 13-1 a Forward Relocation Response message that confirms the requested handover. In step S36, the source MME 13-1 sends a HO command to the mobile relay node 3 via the source donor base station 7-2. This instructs the mobile relay node to perform the handover to the target donor base station 7-3, which it initiates in step S37 by sending the target donor base station 7-3 an RRC Connection Reconfiguration message. This message includes the relay node's identifier (RN ID). In response to receiving this message, the target donor base station 7-3 sends a HO Notify message to the target MME 13-2. This Notify message includes the relay node identifier and the identifier of the new tracking area and thus informs the target MME 13-2 that the mobile relay node 3 has changed tracking area. As the target MME 13-2 was informed by the source MME 13-1 about UEs 5 that are associated with the mobile relay node 3, the target MME 13-2 can update tracking area information held in the UE/relay mobility management data 111 for the mobile relay node and for the associated UEs 5. The target MME 13-2 also informs the HSS 17 of the new tracking area information for the associated UEs 5.

Thus, as can be seen from the description above, the MME 13 can find out about a change of tracking area for a mobile relay node (and hence for the UEs 5 associated with that mobile relay node 3) either from a Path Switch Request or from a HO Notify message and no further action on the part of the mobile relay node or the UEs is required.

Relay Node Mobility with Change of MME (Option 2)

Figure 7A:
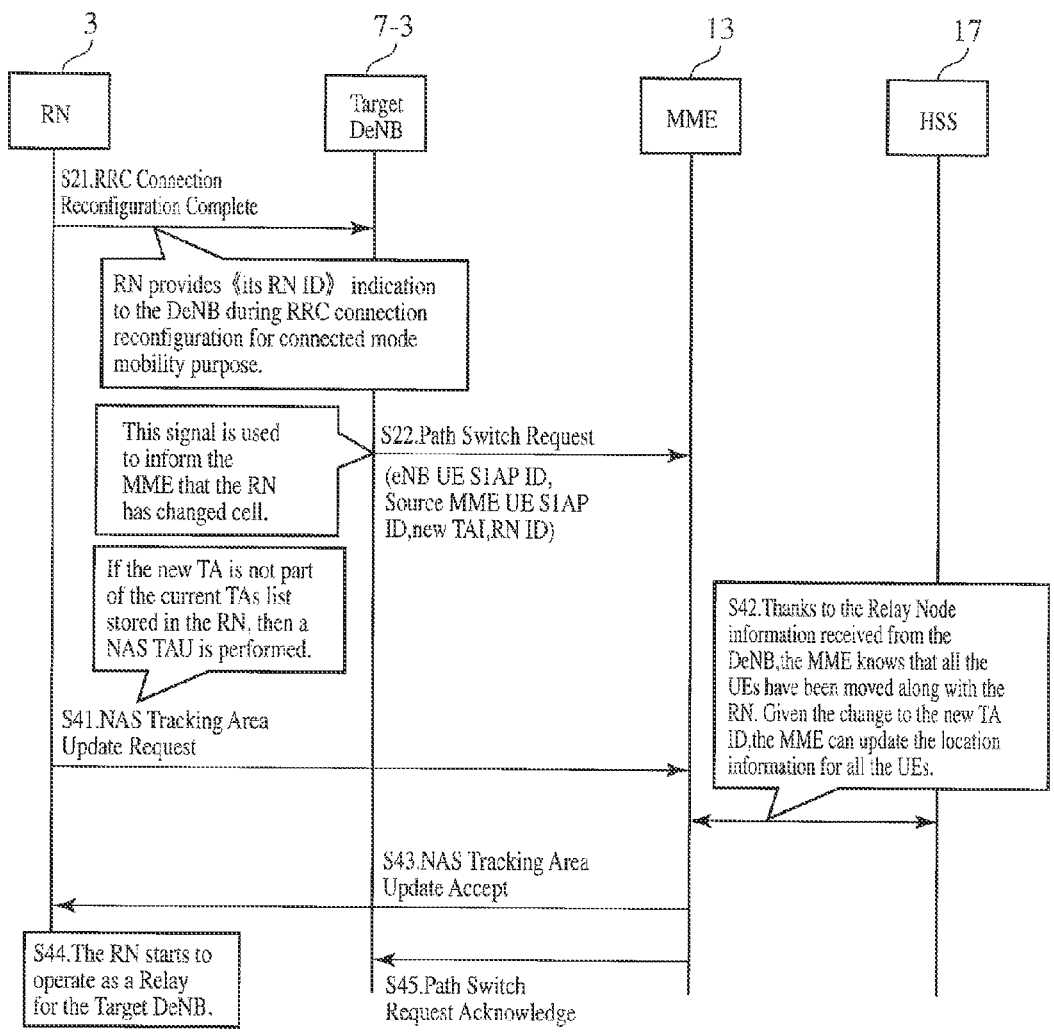
FIG. 7a is a timing diagram illustrating a second procedure for relay node mobility without MME involvement.

FIG. 7*a* illustrates, in general terms, the way in which the mobile relay node 3 hands over to a target donor base station 7-3 when the same MME 13 is used for the target donor base station 7-3, for Option 2 mentioned above. Steps S21 and S22 are the same as shown in FIG. 6*c*. In this Option, however, the MME 13 does not update its stored tracking area information for the mobile relay node 3 and the group of associated UEs 5 in response to receiving the Path Switch Request message. In this Option, the MME 13 waits until the mobile relay node 3 sends a NAS Tracking Area Update Request in step S41. This message identifies the mobile relay node and the new tracking area. The MME 13 uses this information, in step S42, to identify the group of UEs 5 associated with that mobile relay node 3 and then updates the tracking area information (stored in the UE/relay mobility management data 111) for the mobile relay node 3 and for each of those associated UEs 5. The MME 13 also informs the HSS 17 of the new tracking area for the UEs associated with the mobile relay node 3. In step S43 the MME 13 sends to the mobile relay node 3 a NAS Area Update Accept message and in step S44 the relay starts to operate as a relay in the new tracking area. In step S45, the MME 13 sends the target donor base station 7-3 a path switch request acknowledgement message in response to the request received in step S22.

Relay Node Mobility with Change of MME (Option 2)

Figure 7B:
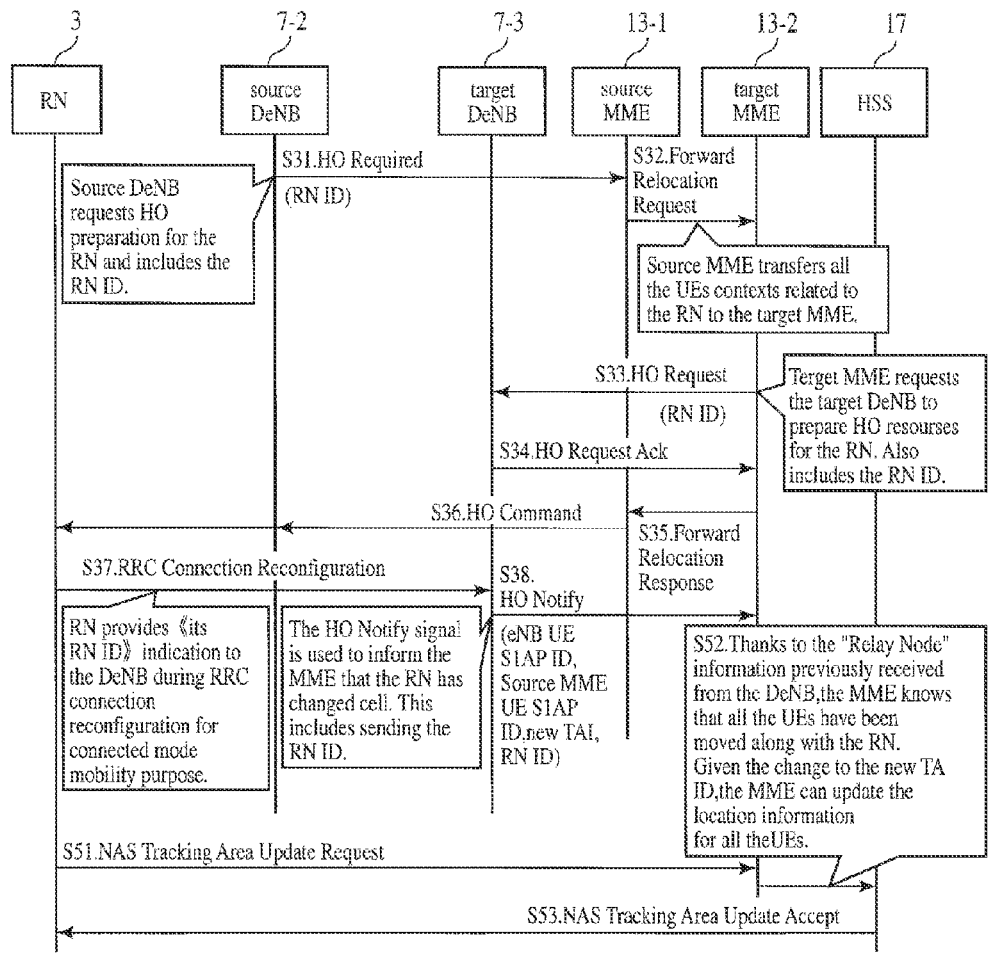
FIG. 7b is a timing diagram illustrating a second procedure for relay node mobility with MME involvement.

FIG. 7*b* illustrates, in general terms, the way in which the mobile relay node 3 hands over to a target donor base station 7-3 when the MME 13 is also changed because the target donor base station 7-3 is served by a different MME 13 for Option 2 discussed above. As shown, in this case, steps S31 to S38 are the same as in Option 1. However, in this exemplary embodiment, the "HO Notify" message sent in step S38 causes the MME 13 to update the stored tracking area for the mobile relay node 3 only, since the static tracking area identifier that is broadcast by the mobile relay node 3 to the UEs 5 has not changed.

In order to update the tracking area for the mobile relay node 3 and the associated UEs 5 as well, in step S51, the mobile relay node 3 sends to the target MME 13-2 a NAS Tracking Area Update Request message that identifies the mobile relay node 3 and the new tracking area. In response, the target MME 13-2 updates the UE/relay mobility management data 111 with the new tracking area for the mobile relay node 3 and the associated UEs 5. The target MME 13-2 also informs the HSS 17. In step S53, the target MME 13-2 sends to the mobile relay node 3 a NAS Tracking Area Update Accept message and the process ends.

Embodiment 2—Overview

Figure 8:
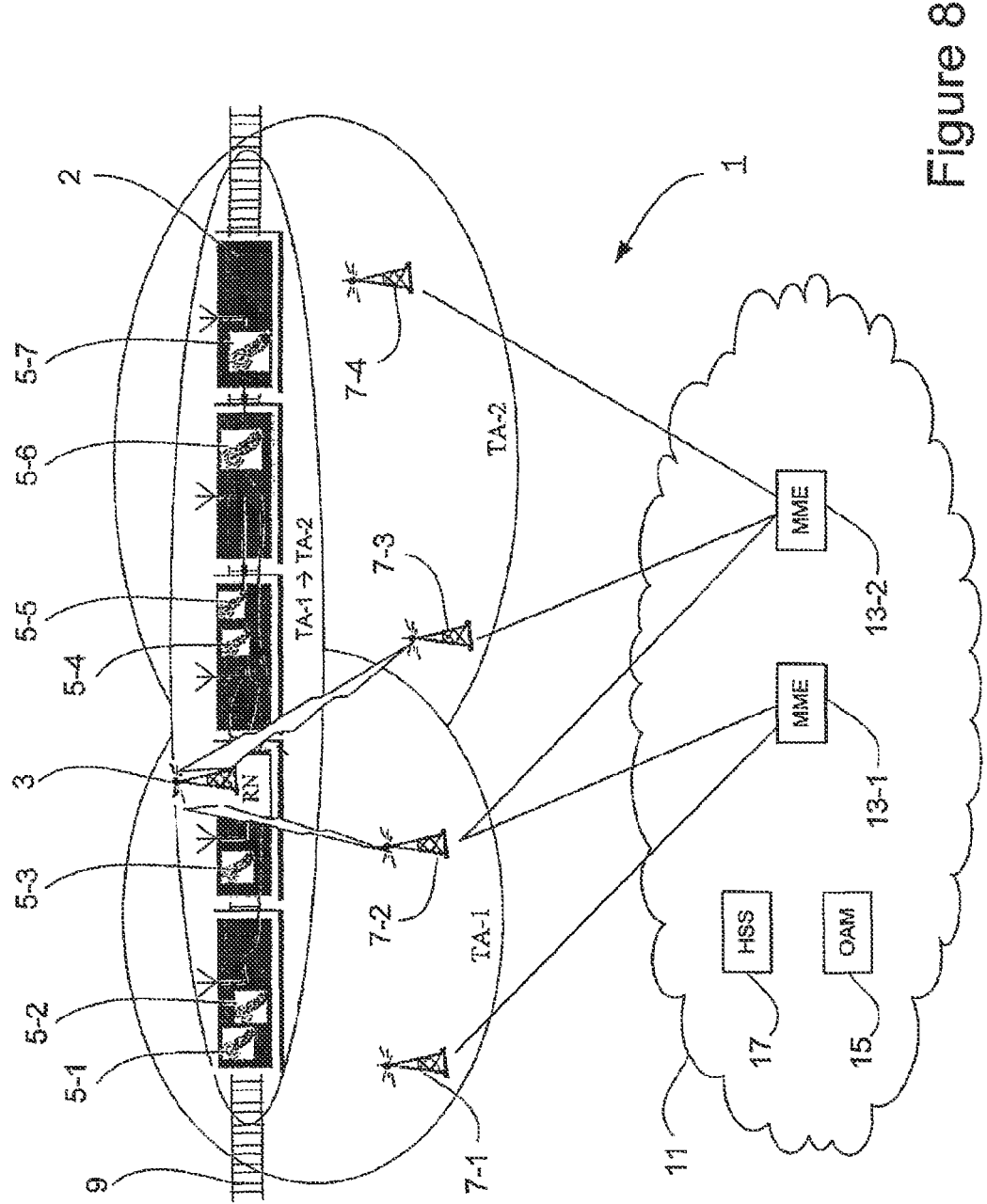
FIG. 8 schematically illustrates a mobile telecommunication system having a mobile relay node mounted in a train.

FIG. 8 schematically illustrates a mobile communications system 1 according to a second exemplary embodiment. This exemplary embodiment is similar to the first exemplary embodiment, however, the owner of the train 2 gives before hand some direction information about the train 2 to the core network 11. The core network 11 uses this direction information to pre-configure, in the mobile relay node 3 and the associated UEs 5, a list of expected Tracking (or location) Area Codes through which the mobile relay node 3 and the associated UEs 5 are expected to pass. As long as the mobile relay node 3 and the associated UEs move within these TACs, they do not need to inform the core network 11 of a change to their tracking area. If they move into a tracking area that is not on the list, then the mobile relay node 3 and the associated UEs 5 have to perform a NAS tracking area update as before. In this way, as long as the relay passes along the expected path, no NAS TA update messages need to be sent to the core network 11.

If the core network does not have sufficient information on the planned route or travel direction of the mobile relay node 3, it prepares an extended list of neighbour tracking areas that it will consider as the most likely candidates for the mobile relay node 3 to visit.

Pre-configuration of Relay and Attach for Relay Operation

Figure 9A:
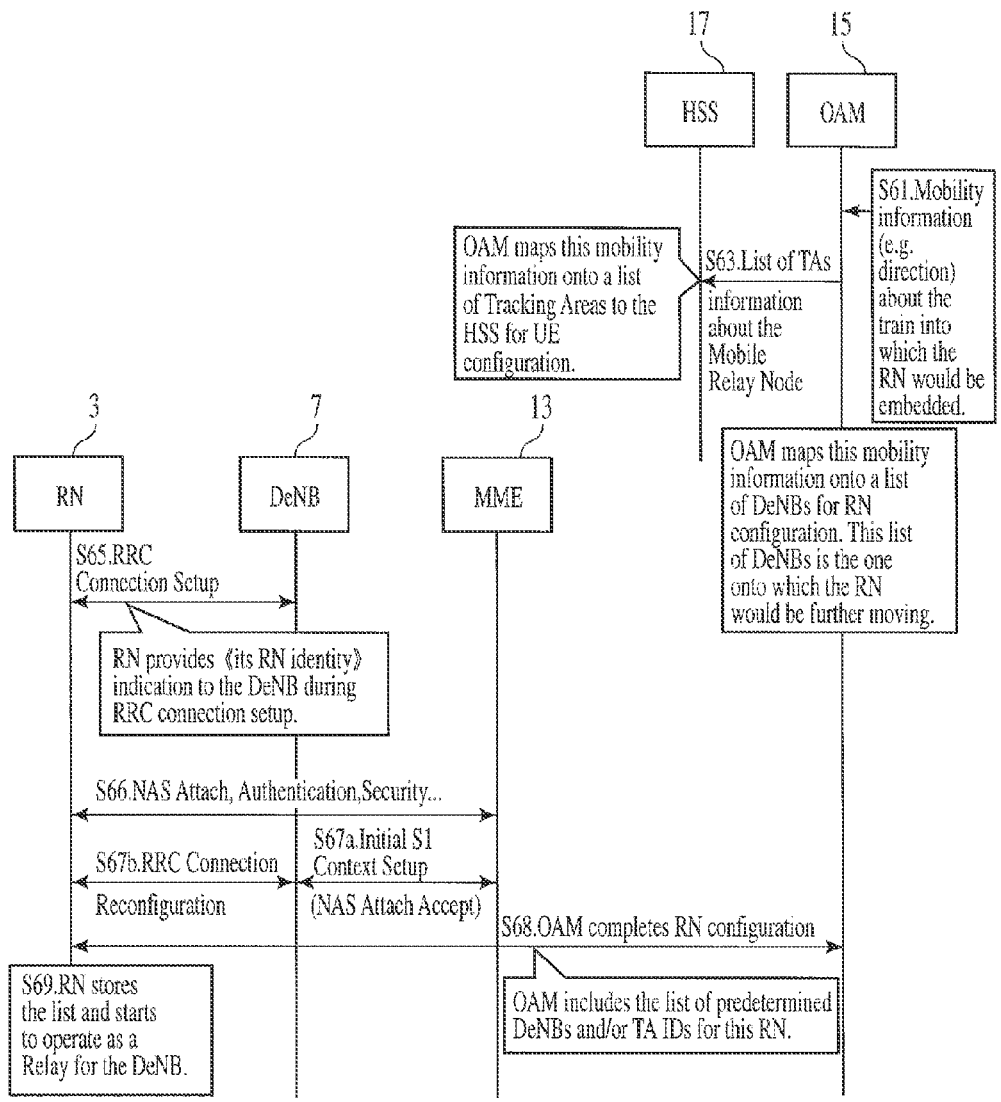
FIG. 9a is a timing diagram illustrating a procedure for attaching the mobile relay node to a base station in the system shown in FIG. 8.

FIG. 9*a* is a timing diagram illustrating the pre-configuration of the mobile relay node 3 in this exemplary embodiment. As shown, in step S61 the OAM 15 receives details of the direction information from the train operator detailing the route that the train is to take. The OAM 15 uses this direction information to identify tracking areas along the route to be taken by the train 2. This information is passed, in step S63 to the HSS 17 for use in subsequent configuring of UEs 5 that will be associated with the mobile relay node 3. The OAM 15 also uses this direction information to determine a list of donor base stations 7 that the mobile relay node 3 will connect to as it travels along the defined route. As will be described below, the OAM 15 sends this information to the mobile relay node when it configures the mobile relay node 3.

Subsequently, when the mobile relay node 3 initially attaches to the core network 11, it sends, in step S65, an RRC Connection Setup message to the donor base station 7. As in the first exemplary embodiment, this message includes the relay node's identifier. In step S66, the mobile relay node 3 and the mobility management entity 13 perform the necessary "NAS Attach, Authentication, and Security" procedures that define the operation parameters used by the mobile relay node 3 and the core network. In step S67a, the "Initial S1 Context Setup" procedure is performed between the donor base station 7 and the mobility management entity 13, including sending the "NAS Attach Accept" response to the donor base station 7.

This is followed by the "RRC Connection Reconfiguration" procedure between the donor base station 7 and the mobile relay node 3, in step S67b. The mobile relay node 3 then receives the final configuration data from the OAM 15 in step S68. In this exemplary embodiment, this configuration data includes the list of predetermined Donor base stations 7 that the mobile relay node 3 is expected to connect with along its defined route. The list is subsequently used by the mobile relay node 3 to facilitate identification of those base stations 7 that the mobile relay node 3 is expected to connect to as it is moving along its defined route.

UE Attaching to the Network Via the Relay

Figure 9B:
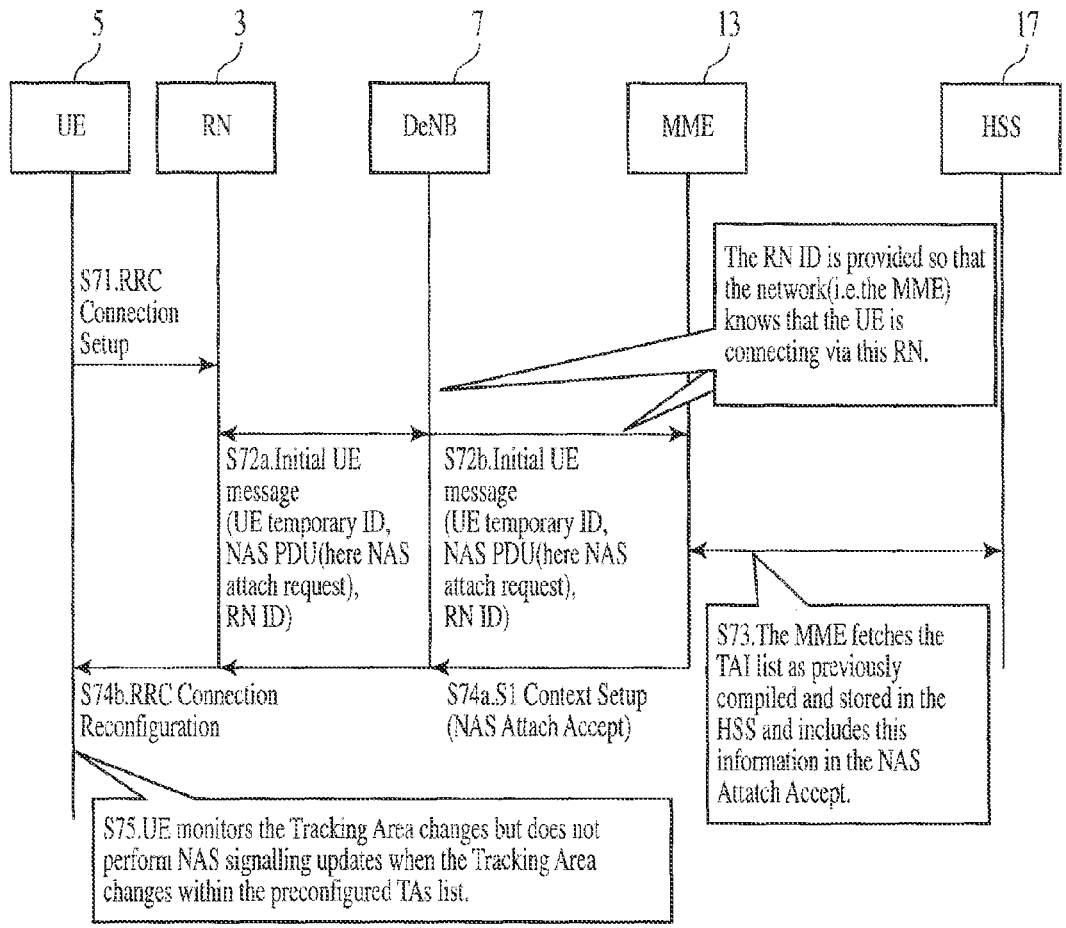
FIG. 9b is a timing diagram illustrating a procedure for attaching user equipment, via the mobile relay node, to the mobile telecommunication system shown in FIG. 8.

FIG. 9b is a timing diagram illustrating the attaching of the UE to the mobile relay node 3. Steps S71 to S72b are the same as steps S11 to S12b described above and will not be described again. In this exemplary embodiment, after the MME 13 receives the Initial UE message, it retrieves the preconfigured list of tracking areas from the HSS 17 in step S73. In step S74a, the MME 13 sends the 51 Context Setup message to the donor base station 7 that includes this tracking area list, which is forwarded on to the UE in step S74b. In step S75 the UE 5 monitors the tracking area changes as the train moves along its defined route and does not perform NAS signalling updates when the tracking area changes within the preconfigured tracking area list.

As in the first exemplary embodiment, the MME 13 must keep track of where the mobile relay node is located (and hence where the associated UEs are located). It can do this in the same manner as in the first exemplary embodiment (see FIG. 6c, 6d, 7a or 7b)—either from RRC connection messages transmitted from the mobile relay node 3 or from NAS update messages transmitted from the mobile relay node 3. This information is required by the MME 13 so that it can send the any paging messages to the associated UEs 5 to the base stations in the correct tracking area.

Modifications and Alternatives

Detailed exemplary embodiments have been described above. As those skilled in the art will appreciate, a number of modifications and alternatives can be made to the above exemplary embodiments whilst still benefiting from the inventions embodied therein.

In an alternative exemplary embodiment, for example, if the relay node does not insert its relay node identifier into the "Initial UE message" (in step S12a) sent via the donor base station, the donor base station may insert the relay node identifier (in step S12b) before forwarding the message to the mobility management entity.

In yet another alternative to the above exemplary embodiments, a fixed radio cell identifier may be used instead of the fixed tracking area identifier.

Two exemplary embodiments were described above. Another exemplary embodiment may be provided, in which the relay and the UEs are programmed with the pre-configured list of tracking areas or donor base stations in accordance with the second exemplary embodiment, when the routing information of the vehicle in which the relay node is mounted is known in advance; and in which the relay operates in accordance with the first exemplary embodiment when advance knowledge of the relay's route is not available.

Whilst in the above exemplary embodiments, the relay node identifier has been described to facilitate group mobility of associated UEs without excessive signalling between the mobile relay node and the base station, and also between the base station and the mobility management entity, other suitable identifiers can be used. For example, the relay node's IP or MAC address or any other unique identifier that has been allocated or assigned to the mobile relay node, can be used instead. This identifier might be provided by the mobile relay node or the donor base station or any other element of the communications network.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the above description, the donor base station, the mobile relay node, the mobility management entity, and the user equipment are described, for ease of understanding, as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Whilst the signalling messages described herein that include the relay node identifier are advantageous in terms of simplicity, ease of implementation and minimising the number of messages required, the relay node identifier may be sent in any of a number of different ways. The relay node identifier may, for example, be sent in a separate message either before or after the messages described in the above exemplary embodiments. Moreover, instead of modifying the described signalling messages, completely new messages may be generated which include the relay node identifier.

While it is beneficial, in terms of ease of implementation, for the mobile relay node or the base station to insert a relay node identifier into the initial UE message, it will be appreciated that an MME may request this identifier from the mobile relay node in a separate message.

In the exemplary embodiments described above, the UE, the mobile relay station and the base station will each include transceiver circuit. Typically this circuit will be formed by dedicated hardware circuits. However, in some exemplary embodiments, part of the transceiver circuit may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from United Kingdom patent application No. 1116924.0, filed on Sep. 30, 2011, the disclosure of which is incorporated herein in its entirety by reference.

The invention claimed is:

1. A mobile relay node for use in a communications system that has a plurality of base stations arranged in a plurality of tracking areas, the mobile relay node comprising:
a transceiver circuit for transmitting signals to and for receiving signals from a base station and for transmitting signals to and for receiving signals from one or more user devices that are associated with the mobile relay node;
a memory for storing a relay node identifier; and
a communications controller for controlling communications between the associated user device and the base station;
wherein the communications controller is configured to send the base station the relay node identifier when the mobile relay node connects to the base station;
wherein the communications controller is configured to receive an RRC Connection Setup request from an associated user device and is arranged to generate an Initial UE message including the relay node identifier and a temporary ID for the associated user device and to transmit the Initial UE message to the base station; and
wherein the communications controller is configured to receive, from a first base station, a fixed tracking identifier; wherein the mobile relay node is configured to broadcast the fixed tracking identifier to the one or more user devices associated with the mobile relay node; wherein the mobile relay node is configured to connect to a second base station that belongs to a different tracking area to that of the first base station; and
wherein the mobile relay node is arranged to continue broadcasting the fixed tracking identifier to the one or more associated user devices.

2. A mobile relay node according to claim 1, wherein the communications controller is configured to receive, from a first base station, a fixed radio cell identifier; wherein the mobile relay node is configured to broadcast the fixed radio cell to the one or more user devices associated with the mobile relay node; wherein the mobile relay node is configured to connect to a second base station that belongs to a different radio cell to that of the first base station; and wherein the mobile relay node is arranged to continue broadcasting the fixed radio cell to the one or more associated user devices.

3. A mobile relay node according to claim 1, wherein the communications controller is arranged to receive a predefined list of tracking areas through which the mobile relay node is expected to pass and wherein the communications controller is arranged to communicate the predefined list of tracking areas to the associated one or more user devices.

4. A mobile relay node according to claim 1, wherein the communications controller is arranged to receive a predefined list of base stations to which the mobile relay node is expected to connect and wherein the mobile relay node is arranged not to send a tracking area update when it moves from a first base station to a second base station that belongs to a different tracking area to that of the first base station, provided the second base station is on the predefined list.

5. A mobile relay node according to claim 1, wherein the communications controller is arranged to receive a predefined list of base stations to which the mobile relay node is expected to connect and wherein the mobile relay node is arranged to send a tracking area update when it moves from a first base station to a second base station that belongs to a different tracking area to that of the first base station.

6. A non-transitory computer program product comprising computer implementable instructions for causing a programmable computer device to become configured as the mobile relay node of claim 1.

7. A base station for use in a communication system, the base station comprising:
a transceiver circuit arranged to transmit signals to and receive signals from a network node of the communication system and to transmit signals to and receive signals from a mobile relay node that allows one or more user devices to connect to the base station through the mobile relay node; and
a communications controller configured to receive a relay node identifier when the mobile relay node connects to the base station and configured to send the relay node identifier to the network node;
wherein the communications controller is configured to receive from the mobile relay node, an Initial UE message from a user device associated with the mobile relay node, the Initial UE message including the relay node identifier and a temporary ID for the associated user device, and wherein the communications controller is further configured to send the received Initial UE message to the network node; and
wherein the communications controller is configured to receive from a network node a fixed tracking identifier for the mobile relay node and is configured to forward the received fixed tracking identifier to the mobile relay node.

8. A base station according to claim 7, wherein the relay node identifier is contained within an RRC Connection Setup request that the base station receives from the mobile relay node and wherein the communications controller is configured to forward the received RRC Connection Setup request to the network node.

9. A base station according to claim 7, wherein the communications controller is configured to receive from a network node a fixed radio cell identifier for the mobile relay node and is configured to forward the received fixed radio cell to the mobile relay node.

10. A base station according to claim 7, wherein the communications controller is configured to receive, from a network node, a predefined list of tracking areas through which the mobile relay node is expected to pass is configured to forward the predefined list to the mobile relay node.

11. A base station according to claim 7, wherein the communications controller is arranged to receive, from a network node, a predefined list of base stations to which the mobile relay node is expected to connect and is arranged to forward the predefined list of base stations to the mobile relay node.

12. A non-transitory computer program product comprising computer implementable instructions for causing a programmable computer device to become configured as the base station of claim 7.

13. A network node for use in a communications system that has a plurality of base stations arranged in a plurality of tracking areas, the network node comprising:
 a transceiver circuit arranged to transmit signals to and receive signals from the base stations; and
 a communications controller configured to receive, from a first base station, a relay node identifier when a mobile relay node connects to the first base station and configured to store the relay node identifier together with tracking area data corresponding to the tracking area associated with the first base station from which the relay node identifier is received;
 wherein said communications controller is configured to receive, from the first base station, an Initial UE message from a user device associated with the mobile relay node, the Initial UE message including the relay node identifier and a temporary ID for the associated user device, and wherein the communications controller is further configured to store data associating the user device with the mobile relay node such that tracking area data associated with the mobile relay node is also associated with the user device; and
 wherein the communications controller is configured to forward to the mobile relay node, via the first base station, a fixed tracking identifier for use by the mobile relay node.

14. A network node according to claim 13, wherein the communications controller is configured to receive, from a second base station, a relay node identifier when the mobile relay node connects to the second base station, and is configured to update the tracking area associated with the mobile relay node and the tracking area associated with any user devices associated with the mobile relay node, if the tracking area of the second base station is different to the tracking area of the first base station.

15. A network node according to claim 13, wherein the communications controller, in response to receiving said user device connection message, to send the user device, via the first base station and the mobile relay node, a predefined list of tracking areas through which the mobile relay node is expected to pass.

16. A network node according to claim 13, wherein the communications controller is configured to forward to the mobile relay node, via the first base station, a fixed radio cell identifier for use by the mobile relay node.

17. A network node according to claim 13, wherein the communications controller, in response to receiving said relay node identifier, forwards any user devices associated with the mobile relay node to a further network node.

18. A network node according to claim 13, wherein the communications controller is configured to receive, from the mobile relay node, a tracking area update message.

19. A network node according to claim 18, wherein the communications controller is configured to update the tracking area associated to any user devices associated with the mobile relay node towards a further network entity.

20. A non-transitory computer program product comprising computer implementable instructions for causing a programmable computer device to become configured as the network node of claim 13.

21. A user device for use with a communication system, the user device comprising:
 a transceiver circuit arranged to transmit signals to and receive signals from a mobile relay node; and
 a communications controller configured to associate with the mobile relay node and to receive from the mobile relay node a current tracking area in which the mobile relay node is located;
 a tracking area handler configured to transmit tracking area update messages when the user device enters a new tracking area;
 wherein the communications controller is configured to receive a predefined list of tracking areas through which the mobile relay node is expected to pass and configured to inhibit operation of the tracking area handler when the new tracking area is on the predefined list; and
 wherein the tracking area handler is configured to detect the new tracking area, is configured to compare the new tracking area with the tracking areas on the predefined list and is configured not to send a tracking area update message if said new tracking area matches a tracking area on the predefined list.

22. A user device according to claim 21, wherein a communications controller is configured to associate with the mobile relay node and to receive from the mobile relay node a current radio cell in which the mobile relay node is located.

23. A non-transitory computer program product comprising computer implementable instructions for causing a programmable computer device to become configured as the user device of claim 21.

24. A method performed by a mobile relay node of a communications system that has a plurality of base stations, the method comprising:
 sending to a base station, a relay node identifier when the mobile relay node connects to the base station;
 receiving an RRC Connection Setup request from an associated user device;
 generating an Initial UE message including the relay node identifier and a temporary ID for the associated user device; and
 transmitting the Initial UE message to the base station;
 wherein the communications controller is configured to receive, from a first base station, a fixed tracking identifier; wherein the mobile relay node is configured to broadcast the fixed tracking identifier to the one or more user devices associated with the mobile relay node; wherein the mobile relay node is configured to connect to a second base station that belongs to a different tracking area to that of the first base station; and wherein the mobile relay node is arranged to continue broadcasting the fixed tracking identifier to the one or more associated user devices.

25. A method performed by a base station of a communication system, the method comprising:

receiving a relay node identifier when a mobile relay node connects to the base station;

sending the relay node identifier to a network node of the communication system;

receiving from the mobile relay node, an initial UE message from a user device associated with the mobile relay node, the Initial UE message including the relay node identifier and a temporary ID for the associated user device; and sending the received Initial UE message to the network node;

wherein the communications controller is configured to receive from a network node a fixed tracking identifier for the mobile relay node and is configured to forward the received fixed tracking identifier to the mobile relay node.

26. A method performed by a network node of a communications system that has a plurality of base stations arranged in a plurality of tracking areas, the method comprising:

receiving, from a first base station, a relay node identifier when a mobile relay node connects to the first base station;

storing the relay node identifier together with tracking area data corresponding to a tracking area associated with the first base station; and receiving, from the first base station, an Initial UE message from a user device associated with the mobile relay node, the Initial UE message including the relay node identifier and a temporary ID for the associated user device; and storing data associating the user device with the mobile relay node such that tracking area data associated with the mobile relay node is also associated with the user device;

wherein the communications controller is configured to forward to the mobile relay node, via the first base station, a fixed tracking identifier for use by the mobile relay node.

27. A method performed by a user device of a communication system, the method comprising:

associating with a mobile relay node;

receiving, from the mobile relay node, a current tracking area in which the mobile relay node is located;

transmitting a tracking area update message when the user device receives a new tracking area;

receiving a predefined list of tracking areas through which the mobile relay node is expected pass; and preventing a tracking area update message from being transmitted when the new tracking area is on the predefined list;

wherein the tracking area handler is configured to detect the new tracking area, is configured to compare the new tracking area with the tracking areas on the predefined list and is configured not to send a tracking area update message if said new tracking area matches a tracking area on the predefined list.

* * * * *